Patented Jan. 14, 1941

2,228,262

UNITED STATES PATENT OFFICE 2,228,262

PRODUCT FOR SEED, PLANT, AND TURF DISINFECTION

William H. Engels and Joseph R. Stevens, Rahway, N. J., assignors to Merck & Co., Inc., Rahway, N. J., a corporation of New Jersey No Drawing. Application February 6, 1937, Serial No. 124,466

7 Claims. (Cl. 167—38)

This invention relates to disinfectants for plant tissue including particularly turf, seeds, bulbs, tubers, etc.

Mercury and inorganic and organic mercury compounds have been widely used for plant disinfection but the prior art has been characterized by serious limitations. In order to measure up to the exacting requirements of a really satisfactory disinfectant for plant tissue, the mercury compound should meet a combination of the following broad standards or counts:

(1) Toxicity to bacteria and fungi.

(2) Substantial freedom from toxicity to plant tissues in concentrations effective against bacteria and fungi.

(3) Capacity to be brought into and to remain in effective physical contact with plant tissue over widely varying periods of time, which may vary from a matter of seconds or minutes to one of weeks or months.

As to counts 1 and 2, it may be said that while practically all mercury-containing compounds display bactericidal and fungicidal properties to a greater or lesser extent, the effective disinfecting concentration of many of the compounds is injurious to plant tissue.

As to the third count above mentioned, i. e. capacity of the agent to be brought into and to remain in effective physical contact over widely varying periods of time, the ramifications of this count are quite diverse, and to respond to this exacting requirement, the substance or substances must be selected, adapted, and applied to meet the special objectives according to the varied properties required.

To illustrate: For some purposes solubility in water is necessary or desirable, e. g. in the treatment of seeds, bulbs and tubers. Here permanency of the disinfectant after application may not always be required and may in some instances be undesirable or dangerous. Speed of penetration and effectiveness of contact may be necessary, as for example in the treatment of seeds, bulbs etc., by the dip methods. Here the surface tension or capillary relationship between the seeds, bulbs etc., and the disinfectant solution must be such as to cause very rapid wetting and penetration and the rate of disinfecting action must be high because exposure of the material to be disinfected to the disinfecting agent may be of very brief duration, e. g. of the order of a minute or less.

For other purposes, permanence of the application is highly desirable, e. g. in the disinfection of turf, such as, for instance golf greens to eliminate "brown patch" and similar diseases. For such and analogous purposes the solubility and volatility of the compounds should be such as to prevent rapid dissipation thereof, by the effects of the weather. A proper degree of insolubility means that the compound will resist the eroding action of rain (and water from other sources) thus permitting the compound to remain in effective contact and exert its activity slowly over a relatively long period of time. Furthermore, tenacious adhesion to the plant tissue under treatment must also be present in combination with the insolubility in order to avoid the eroding effect of rain and water. In order to avoid dissipation through volatilization, a low degree of volatility is necessary in many instances.

In some cases application of the disinfecting material in the form of a dust is desirable, in other cases an aqueous solution may be required and in still other cases an emulsion may be the best form of application.

The prior art does not provide knowledge or teaching of any plant, turf, bulb and seed disinfectant comprising a single substance or group of closely related substances capable of responding to the manifold requirements of a satisfactory disinfectant, as above set forth.

We have found that mercurated fatty acids and mercurated functional derivatives of such fatty acids and also certain non-functional derivatives can be adapted to give products whose physical, germicidal and fungicidal properties are such as to fulfill any given set of requirements, as stated above. The meaning of the terms functional derivatives, as well as non-functional derivatives, will now be set forth.

Corresponding to the fatty acids, there are esters thereof with mono- and polyhydric alcohols, amides and nitriles. Reduction of the carboxylic group of the fatty acid produces first the aldehyde and then the primary alcohol. Esterification of that alcohol with an acid produces an ester. All of these substances, however, have the hydrocarbon chain in common. They differ structurally in the terminal group or radical attached to that hydrocarbon chain. If that chain be designated by the radical R some of the various derivatives referred to can be written as follows, in terms of symbols:

R.COOH   Fatty acid
R.COOR'  Ester of fatty acid where R' is an alkyl, aryl, or aralkyl radical
R.CO.NH$_2$  Acid amide
R.CHO    Aldehyde corresponding to fatty acid
R.CH$_2$OH  Primary alcohol corresponding to fatty acid
R.CH:OOCR''  Ester corresponding to primary alcohol where R'' is an alkyl, aryl, or aralkyl radical.

In the present invention these various derivatives are defined as functional derivatives. It will be noted that the radical R is common to all. This is the fatty-acid radical (exclusive of the carboxyl group). Functional derivatives of fatty acids are therefore those derivatives made by making a change in the functional radical, i. e. the carboxyl group of the fatty acid.

By treating a fatty acid, e. g. recinoleic acid, morrhuic acid, oleic acid, etc. (or functional derivatives of such acids, e. g. the corresponding glycerides, corresponding primary alcohol, etc.) with acid, e. g. sulfuric acid, and functional derivatives of acids, negative or acidic groups can be introduced into the hydrocarbon chain R. Thus by treating castor oil with sulfuric acid, a sulfonated or sulfated castor oil is produced. The same thing can be done with ricinoleic acid which is the fatty acid corresponding to castor oil. The acetyl derivative of castor oil or ricinoleic acid can be produced by treating the oil or corresponding fatty acid with acetic anhydride or acetyl chloride. Various negative groups, e. g. sulfo- and acetyl-groups, can be introduced into the fatty acid radical R by methods known to those skilled in the art, by reacting the fatty acid or functional derivative thereof with an appropriate acid or functional derivative of said acid. To exemplify a few typical functional derivatives of appropriate acids, we may mention ethyl-sulfuric acid, acetyl-sulfuric acid, the anilide of sulfuric acid (phenylsulfaminic acid), cetyl-sulfuric acid, benzene-sulfonic acid, naphthalene-sulfonic acid, etc. Acetyl chloride and acetic anhydride are of course functional derivatives of acetic acid.

Thus it is possible to introduce many negative or acidic radicals into the hydrocarbon radical R to produce corresponding derivatives of fatty acids and of functional derivatives of fatty acids. These acidic or negative derivatives may be defined as non-functional derivatives and may be mercurated according to the teachings of the present invention.

The present invention therefore employs compounds selected from the following four groups of mercurated compounds:

1. Mercurated fatty acids.
2. Mercurated functional derivatives of fatty acids.
3. Mercurated non-functional derivatives of fatty acids.
4. Mercurated non-functional derivatives of functional derivatives of fatty acids.

The following examples will illustrate these groups:

*Group 1.*—Mercurated oleic acid, mercurated morrhuic acid, mercurated ricinoleic acid.

*Group 2.*—Mercurated castor oil, mercurated olive oil, the mercurated alcohol corresponding to oleic acid, the mercurated amide corresponding to oleic acid, etc.

*Group 3.*—Mercurated sulfo-ricinoleic acid, mercurated sulfo-oleic acid, mercurated acetyl ricinoleic acid, mercurated phenyl-sulfo-ricinoleic acid, mercurated naphthyl sulfo-ricinoleic acid, etc.

*Group 4.*—Mercurated sulfated castor oil (mercurated Turkey red oil), mercurated sulfonated olive oil, mercurated phenyl-sulfonated linseed oil, etc.

(Now as to the nature of the reaction referred to herein as mercuration:) When an unsaturated fatty acid or derivative thereof, of the character herein described, reacts with a mercuric salt, it is believed that reaction occurs in the manner indicated by the following equation, the mercuric compound reacting at the double bond:

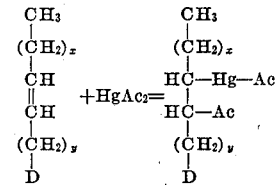

where D represents a functional group as above defined and Ac represents an acid radical.

Due to the peculiar capacity of unsaturated aliphatic linkages to react with mercury salts as above explained, a calculated proportion of mercury can be introduced into the respective molecules. Although the actual mercury content of the final product may be very high, nevertheless, the disinfecting action is without injury to plant tissue in concentrations effective to destroy fungi and bacteria.

With this selective action as a basis, a variety of other necessary properties can be created by joining a suitable radical or radicals to the foundation hydrocarbon radical R and proceeding according to the present invention.

Thus a mercurated fatty acid water-soluble soap or detergent or compound possessing, in solution, a very low surface tension, combined with a high mercury content and a rapid rate of disinfecting action can be prepared by mercurating a fatty acid, follow by conversion of the same into a soap, or by mercurating a complex compound such as Turkey red oil. Thus disinfectants possessing marked surface-tension lowering properties and having a mercury content of from about 5 to 30 per cent or more can be prepared. Solutions of such compounds show surface tensions as low as 50 to 25 dynes per centimeter and are therefore peculiarly effective, due to this combination of properties, in disinfecting seeds, bulbs, tubers etc. according to the disclosures and teachings of the present invention. In such treatments, speed of disinfecting action may be required. The low surface tension of the solutions causes efficient penetration into the area under treatment so that the selective toxicity toward fungi and bacteria may be exerted without injury to plant tissue. In this type of disinfectant, this peculiar combination of properties is believed to be due to the manner in which the mercury atom is joined to the hydrocarbon radical R, and to the nature of the functional and/or non-functional group joined to that radical. In the case of the mercurated fatty acid soaps, the functional radical may be the —COOM radical where M is for example an alkali metal or other basic monovalent group. In the case of mercurated Turkey red oil, the functional radical is the glycerol ester group and the non-functional radical is the acidic sulfo-group.

For other purposes, however, it is desirable to have a compound which is not so rapid in disinfecting action, i. e. one which exerts its activity more slowly over a longer period of time. For this purpose the compound should not be so easily soluble that it may be readily washed away by water, nor so volatile that it is readily dissipated by evaporation. For such purposes, however, low or limited solubility is not enough. Prolonged adherence to the fibre is also necessary. Such a combination of properties is desirable for example in the treatment of brown patch, snow mold, and other similar turf diseases.

Starting with the same basic hydrocarbon radical R, the necessary properties required by the present invention can be imparted by introducing a suitable functional group and by mercuration. By introducing the carboxyl radical and esterifying the resulting fatty acid with glycerin, followed by mercuration, a mercurated fatty oil is obtained having a high mercury content combined with high selective toxicity, resistance to washing away by water, good adhesion, and the property of imparting disinfecting action slowly over a long period of time. The necessary chemical structure may be obtained by mercurating unsaturated fatty oils and other insoluble functional derivatives of fatty acids. The fatty oils are glycerides or glycerol esters of fatty acids. Esters of fatty acids with other polyhydric alcohols and with mono-hydric alcohols, free fatty acids, amides, and nitriles of such acids, fatty alcohols and esters of such alcohols with mono- and poly-basic acids are further examples of water-insoluble functional derivatives capable of mercuration to produce water-resistant, water-repellant, or water-insoluble compounds, the hydrocarbon radical in such derivatives being unsaturated.

Soluble mercurated compounds can be produced and then converted into insoluble compounds. For example, morrhuic, ricinoleic, or oleic acid, can be mercurated, then converted into a soluble soap and insoluble compounds prepared therefrom by treatment with salts of alkaline earth metals, earth metals, and heavy metals to produce a water-insoluble mercurated soap. This type of insoluble compound is particularly suitable for the preparation of dusting powders. Another class of dusting powder can be prepared by adsorption of insoluble mercurated oils to materials such as fuller's earth, diatomaceous earth, bentonite, wood-flour, etc.

As stated, many of the mercurated compounds of this invention are oils difficultly soluble in water. Their application to turf, for example, and the form and manner in which they are applied according to the present invention, provides a relatively long-lasting application. This application is effective not only because of its relative permanency, but also because of the special effectiveness of the mercury compound and the form in which it is prepared for application and the manner by which it is applied.

They can, for instance, be effectively emulsified or dispersed by methods as hereinafter described, a fact which may be attributable to their derivation from a fatty acid capable of forming water-soluble salts possessing marked surface-tension-lowering properties.

These relatively water-resistant or insoluble members of the group possess in respect to turf disinfection at least four important advantages, viz. (1) inherent germicidal and fungicidal properties in concentrations not injurious to plant tissue due to the structure of the molecule and the manner in which mercury is combined in that structure; (2) a peculiarly effective spreading and penetrating power; (3) ready emulsifiability due probably to the fact that, although water-resistant, they are derived in a chemical sense from organic acids which acids per se are capable of forming water-soluble salts possessing marked surface-tension-lowering properties; and (4) permanency and durability against the "washing away" effect of rain, "watering", etc. It is the combination of these properties that makes the compounds in question so particularly effective, for treating turf, tubers, etc.

All of the compounds of this invention, especially the more insoluble ones also find use as disinfectants and preservatives for cordage, wood, fabrics, etc.

The invention will be further described by reference to the following examples:

EXAMPLE 1

*Preparation of mercurated castor oil*

| | |
|---|---|
| Castor oil _____ grams__ | 300 |
| Mercuric acetate _____ grams__ | 300 |
| Methanol _____ liter__ | 1 |

This mixture is warmed until mercuration is complete. One liter of ether is added and the material precipitated with water. More ether is then added and the total ether layer washed with an excess of 5% ammonia.

After further washing with water, the ether solution is dried and concentrated. 475 gms. of oil substantially insoluble in water is obtained. The mercury content is approximately 30 per cent.

EXAMPLE 2

*Preparation of various mercurated oils*

| Oil | Mercuric compound | Solvent | Mercury content of mercurated oil |
|---|---|---|---|
| (1) Olive oil 300 g__ | 300 g. mercuric acetate. | Glacial acetic acid 500 cc. | About 23%. |
| (2) Sesame oil 300 g_ | _____do_____ | _____do_____ | About 28%. |
| (3) Cod liver oil 350 g. | 145 g. mercuric oxide. | Glacial acetic acid 350 cc. | About 4%. |
| (4) Linseed oil 350 g_ | _____do_____ | _____do_____ | Do. |
| (5) Whale oil 175 g__ | _____do_____ | _____do_____ | About 27%. |
| (6) Cocoanut oil 350 g. | _____do_____ | _____do_____ | About 7%. |
| (7) Croton oil 350 g_ | _____do_____ | _____do_____ | About 17%. |
| (8) Neat's-foot oil 250 g. | _____do_____ | _____do_____ | About 6 to 7%. |

It will be seen from this tabulation that the per centage of mercury varies somewhat in the different products. This is due partly to the nature of the oil used. For instance, cocoanut oil being relatively highly saturated, will take up a smaller proportion of mercury. In other cases, e. g. linseed oil and cod liver oil, the mercuration was carried out under relatively mild conditions with the result that a relatively low mercury content was obtained, although the oils are relatively highly saturated. The percentages of mercury shown in the above table are illustrative only and can be varied by modifying the method of procedure adopted for a specific case in the manner indicated.

In the above examples the particular functional derivative employed is the glyceride of a fatty acid, i. e. the ester of the fatty acid and the polyhydric alcohol, glycerin. Instead of this particular functional derivative many others can be mercurated in like manner. They have been hereinabove set forth and include the free fatty acids, their esters, amides and nitriles, the alcohols corresponding to the fatty acids and their esters, etc.

In order to make a relatively insoluble compound available for disinfecting purposes, it is in many cases desirable to apply it in emulsified form. It has been found that the insoluble oily compounds prepared in accordance with this invention can be satisfactorily emulsified by first dissolving the mercurated oil in a solvent partly or wholly miscible with water, e. g. ethyl or methyl alcohol or other suitable water-soluble solvent, and then diluting the alcohol with water to produce an emulsion having a content of mercury suitable for the particular treatment under consideration.

For the purpose of turf disinfection it has been found, for example, that the content of metallic mercury in the spraying emulsion may be of the order of 0.01 to 0.10 per cent by weight. For example, mercurated castor oil having a mercury content of 30 per cent may be dissolved in from 5 to 10 times its volume of ethyl alcohol and this solution further diluted with water until the final volume is 300 to 3000 times the amount of oil used, producing an emulsion containing approximately 0.10 to 0.01 per cent by weight of metallic mercury.

This method of preparing the emulsion is preferred because under the conditions of use the volatile solvent used in the production of the emulsion evaporates, together with the water, leaving a film of disinfecting agent on the plant, e. g. turf tissue, which film is no longer emulsifiable when again contacted with water (rain, water sprays, etc.). The solvent used in producing the emulsion is therefore self-eliminating. It is present when its presence is desired to produce the emulsion and is eliminated when it has served its purpose for emulsification.

Although the solvent used to produce the emulsion readily eliminates itself, according to the present invention, it is present during spraying and may be injurious if present in too high concentration. Therefore, it has been found desirable to keep the metallic mercury in these presolutions within the approximate limit of about 1 to 6 per cent so that upon dilution with water to an appropriate spraying concentration (e. g. 0.05 to 0.10 per cent metallic mercury) the concentration of volatile solvent will be so low as not to be injurious. Such concentrations are effective to destroy fungi and bacteria without injury to plant tissue.

Such emulsions can be used with good success if used immediately and if sprayed from a well agitated vessel. However, when it is desired to produce more stable emulsions, this can be accomplished by adding small amounts of suitable detergents such as Turkey red oil and by keeping the pH slightly on the alkaline side by means of a suitable alkalinizing agent. The concentration of detergent need be so small that after elimination of the volatile organic solvent no subsequent re-emulsification of the film will occur.

EXAMPLE 3

*Preparation of emulsion of insoluble mercurated compound and method of application*

Mercurated olive oil containing about 23 per cent by weight of metallic mercury is dissolved in acetone containing 0.10 per cent Turkey red oil, the proportion of acetone being such as to produce a solution having a content of metallic mercury of 5 per cent by weight. This solution is made slightly ammoniacal, and is then diluted to 500 volumes with water, making a stable emulsion having a content of metallic mercury of 0.01 per cent. The emulsion made from 200 cc of the acetone solution is sprayed through a nozzle giving a fine spray over 1,000 square feet of turf so that the concentration of mercury is about 10 grams of metallic mercury per 1,000 square feet.

In preparing the solution of mercurated compound, prior to emulsification, alcohol, ethylene glycol, monoethyl ether, or other suitable volatile water-soluble solvents can be used in place of acetone.

Instead of using the insoluble mercurated compounds in the form of emulsions, they can be incorporated with material such as fuller's earth, diatomaceous earth, bentonite, wood flour, etc. in the proportion, for example, of 1 to 5 per cent of the insoluble oil to 99 to 95 per cent of the adsorbent to produce an adsorbate which can be used as a dusting compound and has the property of releasing the disinfecting material slowly, a property especially valuable in treating snow mold, where it is necessary for the disinfecting compound to be in contact with the turf all through the winter months.

In special cases it may be desirable to have a relatively low mercury content in the disinfecting compound which may be accomplished by incompletely mercurating an oil or by completely mercurating it and dissolving in an excess of oil. This enables a given quantity of mercury to be distributed evenly over a large area of plant tissue.

For the purpose of dipping seeds, bulbs, etc., it is desirable to have the disinfectant in solution to effect quick penetration into surface tissue. In order to assure quick penetration, it is further desirable to have a solution possessing low surface tension. This could be secured by adding relatively large proportions of a soap or other detergent to a soluble mercuric compound, but it is known that such additions decrease considerably the selective toxic efficiency of the mercury compound. The soluble compounds of the present invention however combine in themselves not only high toxic capacity, but also surface tension lowering properties so that no additional detergent or emulsifier is necessary. Consequently high toxic efficiency is combined with marked surface tension lowering property.

EXAMPLE 4

*Mercurated oleic acid and formation of its corresponding soap*

| | |
|---|---|
| Oleic acid_____g__ | 400 |
| Mercuric acetate_____g__ | 456 |
| Methanol _____g__ | 2000 |

This mixture is warmed for one half hour and then added with good stirring to a solution of 120 grams of sodium chloride in 4 liters of water. The oil is extracted with 3 liters of ether. The ether extract is washed, dried, and concentrated. This concentrate is the mercurated fatty acid. It is dissolved in alcohol, made strongly alkaline (phenol-phthalein) with alcoholic NaOH, concentrated in vacuo and dried over sulfuric acid. Yield 542 grams. Mercury content 23.79%. By using 600 grams of mercuric acetate, completely mercurated oleic acid containing 26.60 per cent by weight of mercury is obtained. The corresponding soap is easily soluble in water forming a soap-like solution.

EXAMPLE 5

*Mercurated ricinoleic acid*

| | |
|---|---|
| Ricinoleic acid_____g__ | 400 |
| Mercuric acetate_____g__ | 400 |
| Methanol _____g__ | 2000 |

This mixture is warmed until there are no more mercuric ions. Ether is added and the mixture treated with water. The aqueous layer is rejected and the ether layer concentrated The concentrate (mercurated fatty acid) is dissolved in methanol and neutralized with NaOH.

In similar manner other fatty compounds may be mercurated and, if desired, converted into their corresponding soluble soaps.

EXAMPLE 6

*Mercurated Turkey red oil*

| | |
|---|---|
| Turkey red oil _____ g__ | 650 |
| Methanol _____ g__ | 4000 |
| Mercuric acetate _____ g__ | 450 |

When mercurated, the material is filtered, made alkaline with NaOH, refiltered and concentrated in vacuo. The yield is about 722 grams; mercury content 20.37 per cent. Fifty per cent $K_2CO_3$ is added to give a product which dissolves clearly. Mercury content 13.57 per cent.

Products made by Examples 4, 5, and 6 combine in themselves marked surface-tension lowering properties and high selective toxic efficiency.

If in the above examples the mercurated fatty acid is neutralized with milk of lime, the insoluble calcium salt is used which after drying can be used as a dusting powder as such or after diluting with a suitable inert powder. Another method of producing such insoluble soaps is to treat the solution of water-soluble mercurated soap with a salt of a metal which will produce an insoluble soap by metathesis. In this way, calcium, barium, copper, zinc and other insoluble mercurated soaps may be prepared.

What we claim is:

1. A disinfectant for plant tissue comprising a compound selected from the group consisting of mercurated normally unsaturated fatty acids and derivatives thereof, wherein the mercury is organically bound at the double bond of the normally unsaturated acid, and where an acidic group is introduced into the hydrocarbon chain.

2. A disinfectant for plant tissue comprising a substantially water-insoluble compound selected from the group consisting of mercurated normally unsaturated fatty acids and derivatives thereof, wherein the mercury is organically bound at the double bond of the normally unsaturated acid, and where an acidic group is introduced into the hydrocarbon chain.

3. A disinfectant for turf comprising a substantially water-insoluble compound selected from the group consisting of mercurated normally unsaturated fatty acids and derivatives thereof, wherein the mercury is organically bound at the double bond of the normally unsaturated acid, and where an acidic group is introduced into the hydrocarbon chain, said compound being dissolved in a volatile organic, substantially water-soluble, solvent in such proportion that the metallic mercury content of said solution is of the order of 1 to 6 per cent.

4. A disinfectant for plant tissue comprising a substantially water-insoluble compound selected from the group consisting of mercurated normally unsaturated fatty acids and derivatives thereof, wherein the mercury is organically bound at the double bond of the normally unsaturated acid, and where an acidic group is introduced into the hydrocarbon chain; said compound being dissolved in a substantially water-soluble organic solvent to produce a solution capable, upon dilution with water, of forming an emulsion capable of application to plant tissue in the form of a film which by evaporation of water and organic solvent yields a weather resistant film.

5. A disinfectant for plant tissue comprising a substantially water-soluble compound selected from the group consisting of mercurated normally unsaturated fatty acid soaps and derivatives thereof, wherein the mercury is organically bound at the double bond of the normally unsaturated acid, and where an acidic group is introduced into the hydrocarbon chain.

6. A disinfectant for plant tissue comprising a substantially water-soluble compound selected from the group consisting of mercurated normally unsaturated fatty acid soaps and derivatives thereof, wherein the mercury is organically bound at the double bond of the normally unsaturated acid, and where an acidic group is introduced into the hydrocarbon chain; said compound having a content of metallic mercury of the order of 5 to 30 per cent and marked surface tension lowering properties.

7. A disinfectant for plant tissue comprising a substantially water-soluble compound selected from the group consisting of mercurated normally unsaturated fatty acid soaps and derivatives thereof, wherein the mercury is organically bound at the double bond of the normally unsaturated acid, and where an acidic group is introduced into the hydrocarbon chain; said compound having a content of metallic mercury of the order of 5 to 30 per cent and the property of forming an aqueous solution having a surface tension of the order of 50 to 25 dynes per centimeter.

WILLIAM H. ENGELS.
JOSEPH R. STEVENS.